No. 782,742.

Patented February 14, 1905.

UNITED STATES PATENT OFFICE.

EMIL FISCHER, OF BERLIN, GERMANY, ASSIGNOR TO THE FIRM OF E. MERCK, OF DARMSTADT, GERMANY, A COPARTNERSHIP.

TRISUBSTITUTED BARBITURIC ACIDS AND PROCESS OF MAKING THEM.

SPECIFICATION forming part of Letters Patent No. 782,742, dated February 14, 1905.

Original application filed January 22, 1903, Serial No. 140,108. Divided and this application filed August 16, 1904. Serial No. 220,969.

(Specimens.)

*To all whom it may concern:*

Be it known that I, EMIL FISCHER, a subject of the Emperor of Germany, and a resident of Berlin, Germany, have invented certain new and useful Improvements in Trisubstituted Barbituric Acids and Processes of Making Them; and I hereby declare the following to be a clear and exact description of my invention.

My invention relates to the production of trisubstituted derivatives of barbituric acid.

The present application, which is a divisional application from my application, Serial No. 140,108, filed January 22, 1903, covers specifically the new trisubstituted barbituric acids characterized by the general formula:

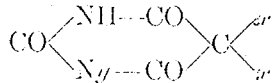

in which $x$ and $y$ represent any radical, such as methyl, for which may be substituted any homologous and analogous radicals described in Examples 8 and 12 of the said application. According to my researches these compounds are obtained by condensing disubstituted malonic esters with monosubstituted urea containing as substituting groups methyl, for which may be substituted any homologous and analogous radical in the presence of sodium alcoholate. In this manner trisubstituted barbituric acids are obtained which form colorless crystals difficultly soluble in water, soluble in sodium hydroxid and potassium hydroxid, thus forming salts by the replacement of the hydrogen of the NH group by metal. These products possess therapeutic value as hypnotics, the average dose being 0.5 to one gram.

In naming the products described herein I add the letter N to that radical which replaces the H of the NH group, as it appears in my scientific publications on this subject.

In carrying out my process practically I can proceed as follows:

*Example 1—Diethyl-N-methyl-barbituric acid.*—To a solution as concentrated as possible of 7.4 parts of sodium in alcohol, 23.2 parts of diethyl-malonic-diethyl acid ester and 7.9 parts of methyl-urea are added and the mixture is heated to 100° to 105° centigrade in a closed vessel. During the operation the sodium salt of the new barbituric acid derivative is precipitated. On cooling it is filtered off, decomposed with hydrochloric acid, and the precipitated diethyl-N-methyl-barbituric acid is recrystallized from hot water. This compound crystallizes in colorless needles, melting at 154.5° centigrade and has the composition $C_9H_{14}N_2O_3$.

*Example 2—Diethyl-N-phenyl-barbituric acid.*—6.4 parts of sodium are dissolved in as little alcohol as possible, twenty parts of diethyl-malonic ester and 16.7 parts of powdered phenyl-urea are added, and the mixture is heated to 105° to 108° centigrade for four hours, wherein but a little sodium carbonate precipitates. Then the mixture is acidulated with hydrochloric acid and the alcohol is evaporated. The hereby-precipitated diethyl-N-phenyl-barbituric acid is washed with cold water and then recrystallized from a great deal of hot water. The melting-point of this acid is 197° centigrade. It has the composition $C_{14}H_{16}O_3N_2$ and dissolves slightly in hot alcohol and in alkali solutions.

Although I have above described examples by which the trisubstituted barbituric acids may be obtained, nevertheless I do not wish to be understood as thereby excluding equivalents for the ingredients, the apparatus, or the operations employed in the process. It is probable that substitutes may be employed without departing from the scope of the invention intended to be secured hereby.

The new trisubstituted barbituric acids possess the property of forming salts with many metals—for example, the alkali metals, the hydrogen of the NH group being replaced by the metal.

Having now described my invention and in what manner the same is to be performed, what I claim as new, and desire to secure by Letters Patent, is—

1. The herein-described new process of making trisubstituted barbituric acids, having the general formula

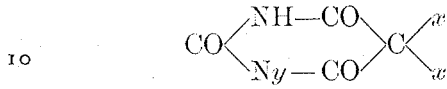

in which $x$ and $y$ represent any radical, such as methyl, for which may be substituted any homologous and analogous groups, consisting in condensing the corresponding disubstituted malonic-acid esters with monosubstituted urea in the presence of metal alcoholate, and decomposing the thus-formed sodium salts of the trisubstituted barbituric acids by means of acid, thus producing the free trisubstituted barbituric acids.

2. The herein-described new process of making diethyl-N-methyl barbituric acid, consisting in condensing diethyl malonic-acid ester and methyl urea in the presence of metal alcoholate, separating the thus-formed sodium salt of the diethyl-N-methyl barbituric acid by filtration and precipitating the free diethyl-N-methyl barbituric acid by means of acid.

3. The herein-described new products being trisubstituted barbituric acids, having the following general formula

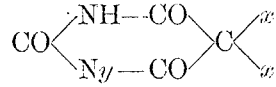

in which $x$ and $y$ represent any radicals, such as methyl for which may be substituted any homologous and analogous group, characterized by forming large crystals, difficultly soluble in hot water and soluble in solutions of alkali and in the salt form of which the hydrogen of the NH group is replaced by alkali metal.

4. The herein-described new diethyl-N-methyl barbituric acid, which in the acid form melts at 154.5° centigrade when recrystallized from hot water and is soluble in solutions of sodium hydrate and potassium hydrate and in the salt form of which the metal replaces the hydrogen of the NH group.

In testimony whereof I have signed my name in the presence of two subscribing witnesses.

EMIL FISCHER.

Witnesses:
   E. ALDERHALDEN,
   F. REUTER.